United States Patent
Hosseini et al.

(10) Patent No.: US 12,021,634 B2
(45) Date of Patent: Jun. 25, 2024

(54) RESOURCE DETERMINATION FOR SIDELINK HYBRID AUTOMATIC REPEAT REQUEST FEEDBACK

(71) Applicant: QUALCOMM Incorporated, San Diego, CA (US)

(72) Inventors: Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/125,856

(22) Filed: Dec. 17, 2020

(65) Prior Publication Data

US 2022/0200738 A1 Jun. 23, 2022

(51) Int. Cl.
- *H04L 5/00* (2006.01)
- *H04L 1/1812* (2023.01)
- *H04W 72/02* (2009.01)
- *H04W 72/0446* (2023.01)

(52) U.S. Cl.
CPC .......... *H04L 1/1819* (2013.01); *H04L 5/001* (2013.01); *H04L 5/0055* (2013.01); *H04W 72/02* (2013.01); *H04W 72/0446* (2013.01)

(58) Field of Classification Search
CPC ..... H04L 1/1819; H04L 5/001; H04L 5/0055; H04W 72/02; H04W 72/0446
See application file for complete search history.

(56) References Cited

U.S. PATENT DOCUMENTS

| | | | |
|---|---|---|---|
| 2020/0196255 A1* | 6/2020 | Cheng | H04L 5/0064 |
| 2020/0220669 A1 | 7/2020 | Park | |
| 2021/0050953 A1* | 2/2021 | Park | H04B 7/0456 |
| 2021/0136646 A1* | 5/2021 | Tseng | H04W 36/0088 |
| 2021/0337527 A1* | 10/2021 | Hui | H04L 1/1861 |
| 2022/0046564 A1* | 2/2022 | Shimoda | H04W 80/00 |
| 2022/0150908 A1* | 5/2022 | Ji | H04W 72/1205 |
| 2023/0262660 A1* | 8/2023 | Park | H04L 5/0053 370/329 |

OTHER PUBLICATIONS

International Search Report and Written Opinion—PCT/US2021/072437—ISA/EPO—Mar. 2, 2022.

(Continued)

*Primary Examiner* — Jae Y Lee
*Assistant Examiner* — Aixa A Guadalupe Cruz
(74) *Attorney, Agent, or Firm* — Harrity & Harrity, LLP

(57) ABSTRACT

Various aspects of the present disclosure generally relate to wireless communication. In some aspects, a user equipment (UE) may receive a plurality of physical sidelink shared channel (PSSCH) communications on a plurality of sidelink component carriers. The UE may transmit, using a set of resources on a single component carrier of the plurality of sidelink component carriers and based at least in part on a determination of the set of resources, a plurality of hybrid automatic repeat request acknowledgement (HARQ-ACK) feedback indications corresponding to the plurality of PSSCH communications, wherein the determination of the set of resources is based at least in part on a physical sidelink feedback channel (PSFCH) format. Numerous other aspects are provided.

30 Claims, 10 Drawing Sheets

(56) References Cited

OTHER PUBLICATIONS

Zte: "ACK/NACK Design for LTE-Advanced", 3GPP Draft, TSG-RAN WG1 #58bis, R1-094739, An Design for LTE-A, 3rd Generation Partnership Project (3GPP), Mobile Competence Centre, 650, Route Des Lucioles, F-06921 Sophia-Antipolis Cedex, France, No. Jeju, Nov. 9, 2009, Nov. 9, 2009 (Nov. 9, 2009), XP050389136, pp. 1-7, [Retrieved on Nov. 3, 2009], The Whole Document.

\* cited by examiner

RESOURCE DETERMINATION FOR SIDELINK HYBRID AUTOMATIC REPEAT REQUEST FEEDBACK

FIELD OF THE DISCLOSURE

Aspects of the present disclosure generally relate to wireless communication and to techniques and apparatuses for resource determination for sidelink hybrid automatic repeat request feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to: receive a plurality of physical sidelink shared channel (PSSCH) communications on a plurality of sidelink component carriers; and transmit, using a set of resources on a single component carrier of the plurality of sidelink component carriers and based at least in part on a determination of the set of resources, a plurality of hybrid automatic repeat request acknowledgement (HARQ-ACK) feedback indications corresponding to the plurality of PSSCH communications, wherein the determination of the set of resources is based at least in part on a physical sidelink feedback channel (PSFCH) format.

In some aspects, a UE for wireless communication includes a memory and one or more processors coupled to the memory, the memory and the one or more processors configured to: transmit a plurality of PSSCH communications on a plurality of sidelink component carriers; and receive, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

In some aspects, a method of wireless communication performed by a UE includes receiving a plurality of PSSCH communications on a plurality of sidelink component carriers; and transmitting, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

In some aspects, a method of wireless communication performed by a UE includes transmitting a plurality of PSSCH communications on a plurality of sidelink component carriers; and receiving, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

In some aspects, a non-transitory computer-readable medium storing a set of instructions for wireless communication includes one or more instructions that, when executed by one or more processors of a UE, cause the UE to: receive a plurality of PSSCH communications on a plurality of sidelink component carriers; and transmit, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

In some aspects, a non-transitory computer-readable medium storing a set of instructions for wireless communication includes one or more instructions that, when executed by one or more processors of an UE, cause the UE to: transmit a plurality of PSSCH communications on a plurality of sidelink component carriers; and receive, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

In some aspects, an apparatus for wireless communication includes means for receiving a plurality of PSSCH communications on a plurality of sidelink component carriers; and means for transmitting, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

In some aspects, an apparatus for wireless communication includes means for transmitting a plurality of PSSCH communications on a plurality of sidelink component carriers; and means for receiving, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
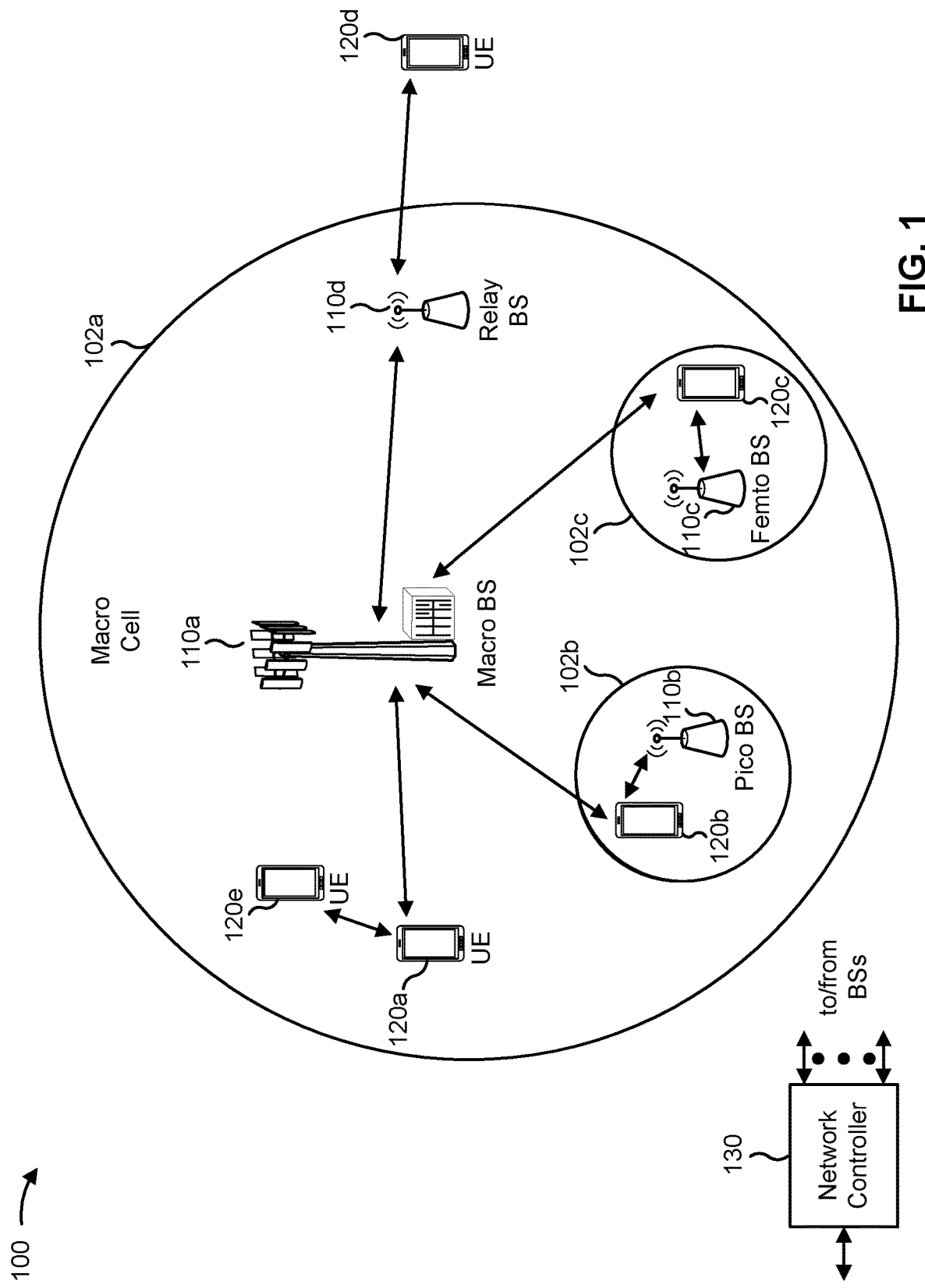
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
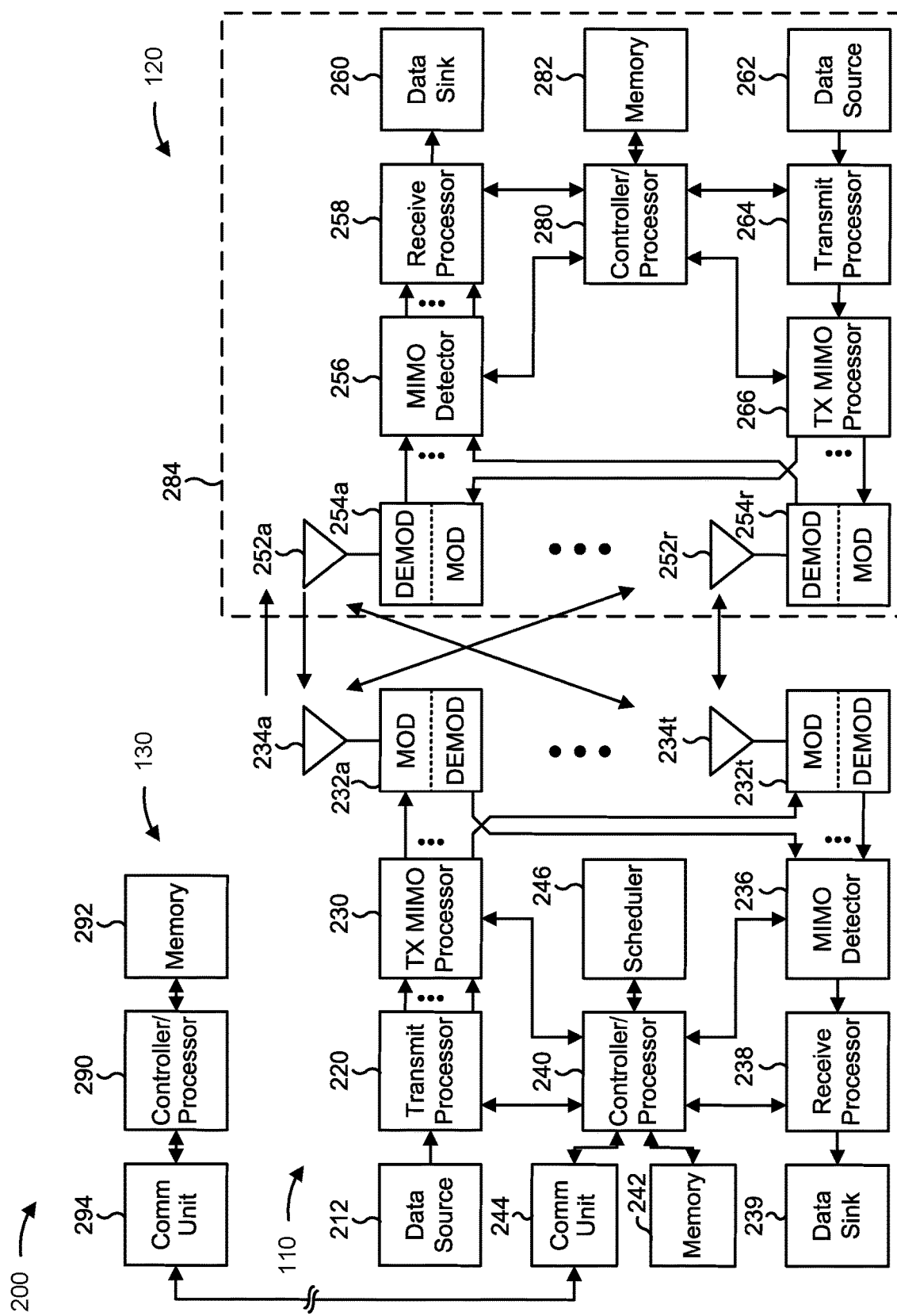
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-9.

Controller/processor 240 of base station 110, controller/processor 280 of UE 120, and/or any other component(s) of FIG. 2 may perform one or more techniques associated with resource determination for sidelink hybrid automatic repeat request (HARD) feedback, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for receiving a plurality of PSSCH communications on a plurality of sidelink component carriers; and/or means for transmitting, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an explicit indication that indicates the set of resources; and/or means for determining the set of resources based at least in part on the explicit indication. In some aspects, the UE includes means for receiving the explicit indication from a base station. In some aspects, the UE includes means for receiving the explicit indication from an additional UE, wherein receiving the plurality of PSSCH communications comprises receiving the plurality of PSSCH communications from the additional UE.

In some aspects, the UE includes means for determining an implicit indication that indicates the set of resources; and/or means for determining the set of resources based at least in part on the implicit indication. In some aspects, the UE includes means for determining the implicit indication based at least in part on determining the prior transmission based at least in part on a plurality of monitoring occasions associated with a slot across the plurality of component carriers. In some aspects, the UE includes means for determining the implicit indication based at least in part on determining the prior transmission based at least in part on a time period associated with a plurality of slots. In some aspects, the UE includes means for determining a subset of a resource pool based at least in part on the implicit indication; and/or means for determining the set of resources based at least in part on a PSFCH resource indication. In some aspects, the UE includes means for receiving the implicit indication from a base station. In some aspects, the UE includes means for receiving the implicit indication from a base station by way of a relay device. In some aspects, the UE includes means for determining the implicit indication based at least in part on a negotiation with an additional UE. In some aspects, the UE includes means for determining a PSSCH-to-HARQ gap based at least in part on an explicit indication. In some aspects, the UE includes means for determining a PSSCH-to-HARQ gap based at least in part on an implicit indication. In some aspects, the UE includes means for transmitting a first set of HARQ-ACK feedback indications of the plurality of HARQ-ACK feedback indications; and/or means for dropping a second set of HARQ-ACK feedback indications based at least in part on at least one of a format of the set of HARQ-ACK feedback indications or a payload of the set of HARQ-ACK feedback indications.

In some aspects, the UE includes means for transmitting a plurality of PSSCH communications on a plurality of sidelink component carriers; and/or means for receiving, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting an explicit indication that indicates the set of resources, wherein the determination of the set of resources is based at least in part on the explicit indication. In some aspects, the UE includes means for receiving the explicit indication from a base station.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
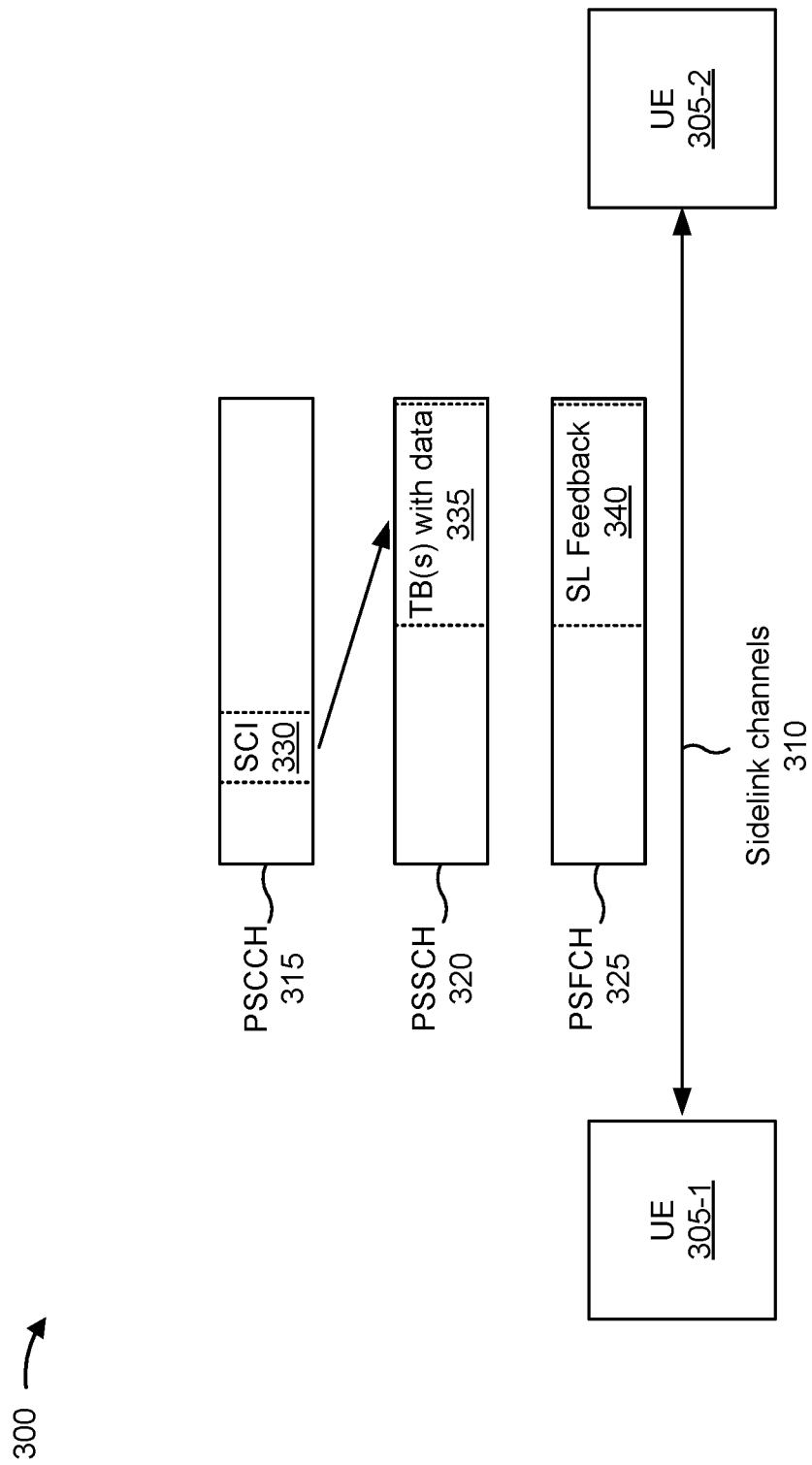
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
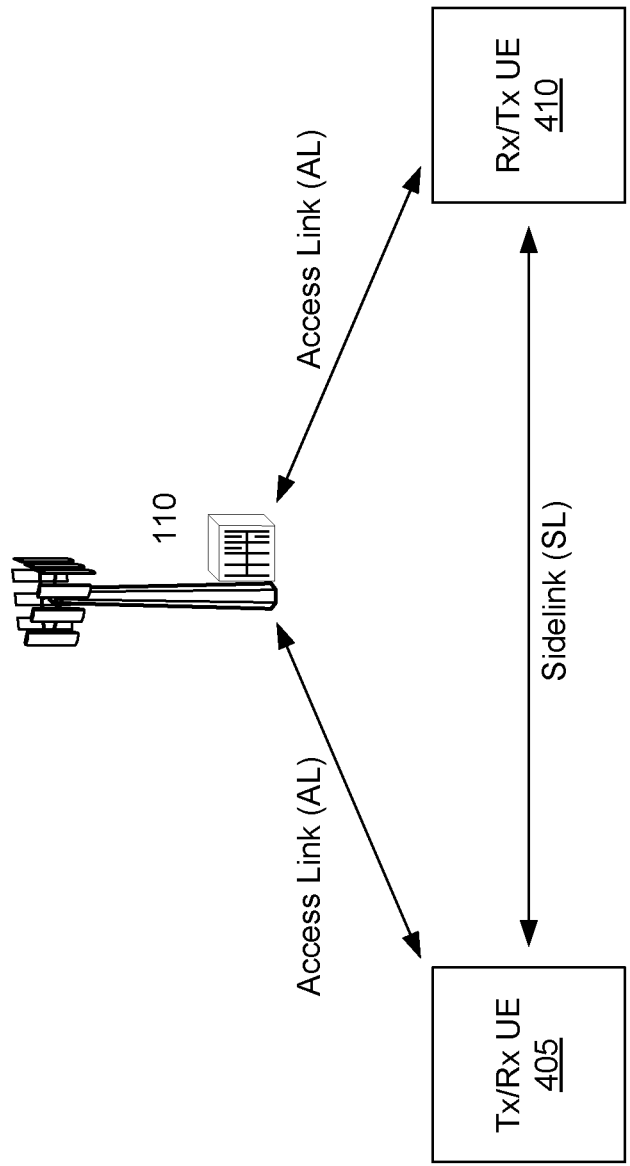
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
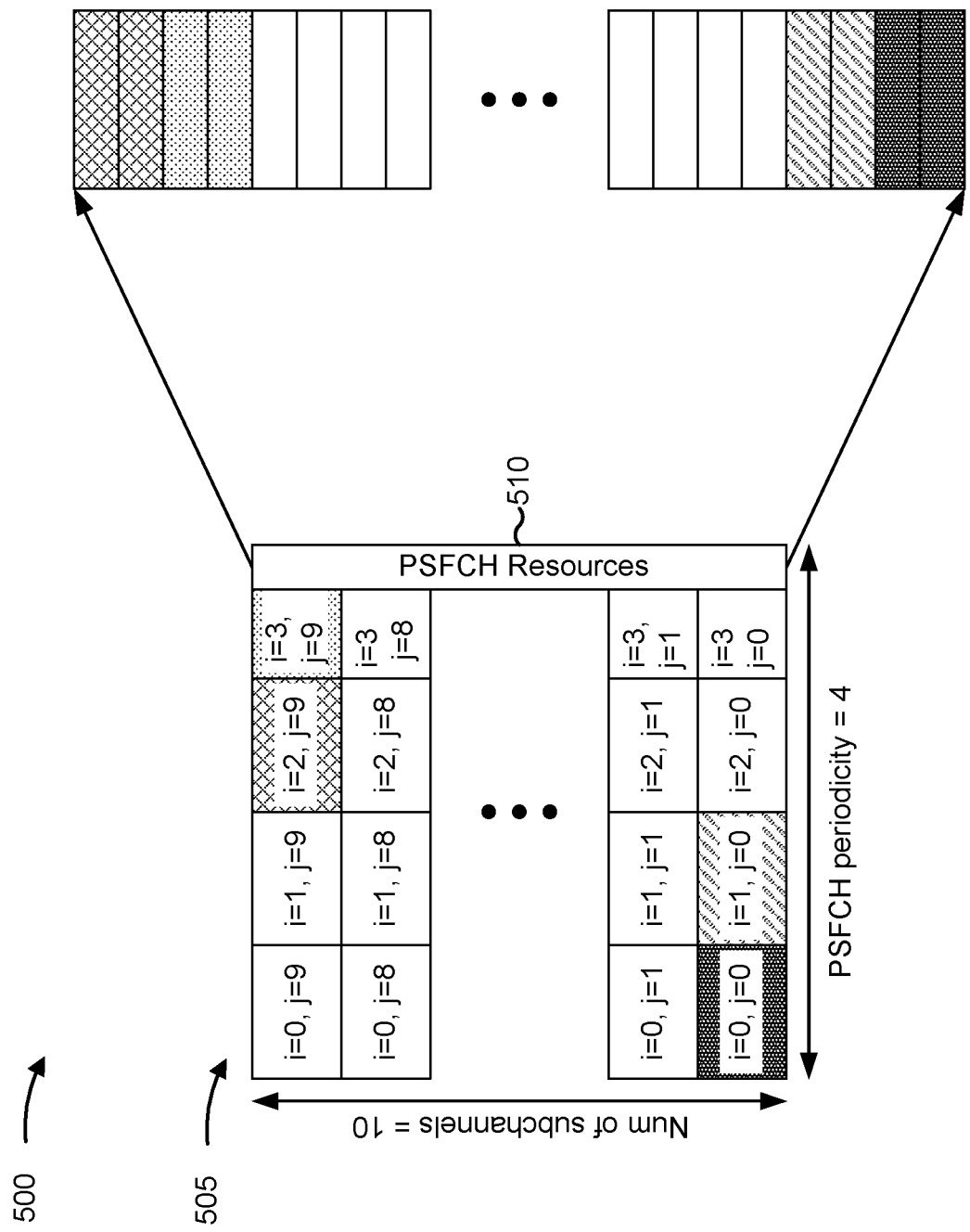
FIG. 5 is a diagram illustrating an example of sidelink feedback channel resource determination, in accordance with various aspects of the present disclosure.

FIG. 5 is a diagram illustrating an example 500 of sidelink feedback channel resource determination, in accordance with various aspects of the present disclosure. FIG. 5 shows a resource pool 505. The resource pool 505 includes 10 subchannels ($N_{subch}$=10), of which four are shown. A subchannel is a frequency-domain subset of a resource pool. A resource pool can be configured with one or more subchannels. A resource pool can be configured with a PSFCH periodicity, which indicates a periodicity of PSFCH transmissions associated with the resource pool. In example 500, the resource pool 505 is configured with a PSFCH periodicity of 4 ($N_{PSSCH}^{PSFCH}=4$). PSFCH resources 510 indicated by the PSFCH periodicity are in the fourth slot of the resource pool 505.

A UE may allocate a configured number of physical resource blocks (PRBs) for the PSFCH resources 510. In example 500, the UE may allocate 80 PRBs for the PSFCH resources 510 ($M_{PRB,set}^{PSFCH}=80$). A PRB is a group of subcarriers, and may include 12 subcarriers. Since there are 4 slots between each PSFCH resource (due to $N_{PSSCH}^{PSFCH}$) and 10 subchannels in the resource pool (due to $N_{subch}$), each subchannel is associated with 2 of the 80 PSFCH PRBs (e.g., 80 PRBs/(4 slots*10 subchannels)=2 PRBs). In this case, the sidelink feedback for a subchannel and slot may be transmitted on 1 of the 2 corresponding PSFCH PRBs. Referring to slot i and subchannel j, as shown in FIG. 5, the UE may allocate the $[(i+j \cdot N_{PSSCH}^{PSFCH}) \cdot M_{subch,slot}^{PSFCH}, (i+1+j \cdot N_{PSSCH}^{PSFCH}) \cdot MN_{subch,slot}^{PSFCH}-1]$ PRBs from $M_{PRB,set}^{PSFCH}$ PRBs to slot i and sub-channel j, where $0 \leq i \leq N_{PSSCH}^{PSFCH}$ and $0 \leq j \leq N_{subch}$.

As mentioned above, the PSFCH resources 510 may be used to transmit HARQ feedback regarding PSSCHs received in the resource pool 505. Sidelink HARQ may be sequence-based, and may carry a single bit per PSSCH. Sidelink HARQ may be sent on two consecutive symbols (e.g., symbols 11 and 12 of a slot). In some cases, one symbol before and one symbol after a PSFCH occasion may be assigned to a gap. A periodicity parameter (e.g., periodPSFCHresource) may indicate the PSFCH periodicity, in terms of a number of slots, for a resource pool. For example, the PSFCH periodicity can be set to a value in the set {0,1,2,4}. If the PSFCH periodicity is set to 0, PSFCH transmissions from a UE in the resource pool are disabled. In example 500, the PSFCH periodicity is set to 4, so PSFCH transmissions are performed in every fourth slot. The UE may transmit the PSFCH in a first slot that includes PSFCH resources and is at least a number of slots, provided by a parameter (e.g., MinTimeGapPSFCH) of the resource pool after a last slot of the PSSCH reception. A parameter (e.g., rbSetPSFCH) may indicate a set and/or a number of $M_{PRB,set}^{PSFCH}$ PRBs in a resource pool for PSFCH transmission. A parameter (e.g., numSubchannel) may indicate a number of N subch subchannels for the resource pool. $N_{PSSCH}^{PSFCH}$ may indicate a number of PSSCH slots associated with a PSFCH slot, which may be determined based at least in part on the parameter periodPSFCHresource described above. In some aspects, $$M_{PRB,set}^{PSFCH} = \alpha \cdot N_{subch} \cdot N_{PSSCH}^{PSFCH} \text{ and } M_{subch,slot}^{PSFCH} = \frac{M_{PRB,set}^{PSFCH}}{N_{subch} \cdot N_{PSSCH}^{PSFCH}}.$$

As indicated above, FIG. 5 is provided as an example. Other examples may differ from what is described with respect to FIG. 5.

A sidelink deployment may support carrier aggregation (CA). In CA, multiple frequency blocks (referred to as component carriers (CCs) or cells) are assigned to a single user. Sidelink CA may improve sidelink throughput relative to a single-carrier configuration. For example, in sidelink CA, a first UE and a second UE may use multiple CCs to communicate with each other. In some examples, sidelink CA may be implemented using a plurality of resource pools. For example, each CC of a sidelink CA configuration may include one or more bandwidth parts (BWPs), and each BWP may include one or more resource pools. In this way, each CC of a sidelink CA configuration may be associated with a respective resource pool or resource pools. The techniques and apparatuses described herein are not limited to those involving respective resource pools for each CC, and can be applied in situations where multiple CCs are configured on a single resource pool, multiple BWPs are configured on a single resource pool, multiple resource pools are configured on a single CC, and/or multiple resource pools are configured on a single BWP, among other examples.

HARQ feedback provides a mechanism for indicating, to a transmitter of a communication, whether the communication was successfully received or not. For example, the transmitter may transmit scheduling information for the communication. A receiver of the scheduling information may monitor resources indicated by the scheduling information in order to receive the communication. If the receiver successfully receives the communication, the receiver may transmit an acknowledgment (ACK) in HARQ feedback. If the receiver fails to receive the communication, the receiver may transmit a negative ACK (NACK) in HARQ feedback. Thus, based at least in part on the HARQ feedback, the transmitter can determine whether the communication should be retransmitted. HARQ feedback is often implemented using a single bit, where a first value of the bit indicates an ACK and a second value of the bit indicates a NACK. Such a bit may be referred to as a HARQ-ACK bit. HARQ-ACK feedback may be conveyed in a HARQ codebook, which may include one or more bits indicating ACKs or NACKs corresponding to one or more communications.

For sidelink CA, HARQ feedback may relate to communications on multiple sidelink CCs. For example, a first UE may transmit HARQ feedback to a second UE regarding multiple PSSCHs on different CCs. As another example, a first UE may transmit HARQ feedback to multiple different UEs regarding PSSCHs received from the multiple different UEs on different CCs. However, if an expected set of resources for transmission of the HARQ feedback is not aligned between the first UE and the second UE (or the multiple different UEs), then the HARQ feedback cannot be reliably interpreted by the recipient of the HARQ feedback. Failure to properly interpret the HARQ feedback may lead to diminished throughput, unnecessary retransmission, and usage of computing and communication resources.

Some techniques and apparatuses described herein provide HARQ feedback for sidelink UEs using a sidelink CA configuration. For example, some techniques and apparatuses described herein provide for determining resources for reporting sidelink HARQ feedback associated with PSSCH communications received using a number of component carriers. The HARQ feedback may be reported on a single component carrier. In some aspects, the HARQ feedback may include multiple bits for each received PSSCH communication. In some cases, if the number of resources per resource set satisfies a threshold, the resources may be explicitly indicated. If the number of resources fails to satisfy the threshold, an implicit indication of the resources or sets thereof may be used. In this way, ambiguity regarding the resources on which HARQ is reported is eliminated, which enables the reliable usage of HARQ feedback for sidelink CA configurations.

Figure 6:
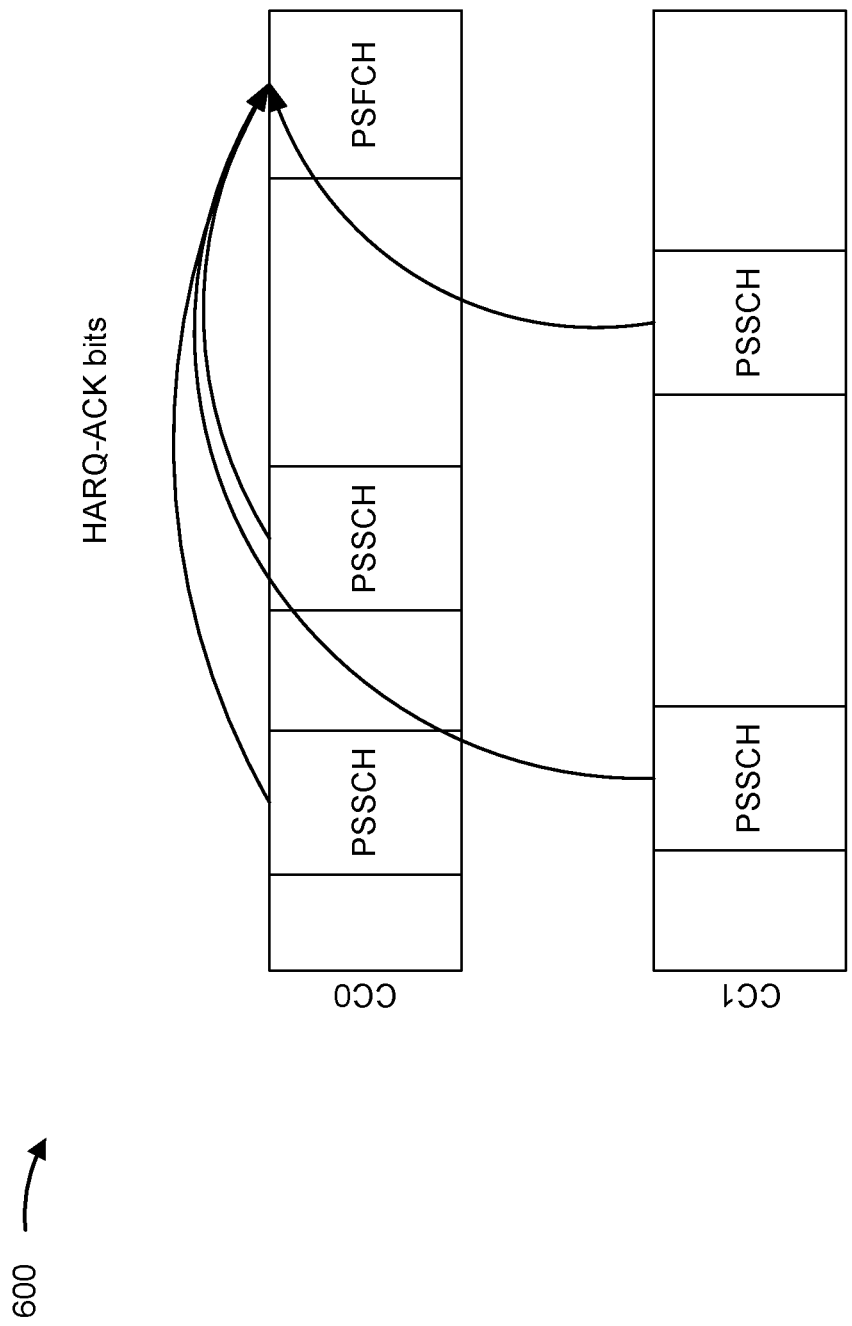
FIG. 6 is a diagram illustrating an example of sidelink feedback for multiple sidelink component carriers, in accordance with various aspects of the present disclosure.

FIG. 6 is a diagram illustrating an example 600 of sidelink feedback for multiple sidelink component carriers, in accordance with various aspects of the present disclosure. Example 600 shows a first CC (CC0) and a second CC (CC1), which are sidelink CCs between a first UE (e.g., a receiver UE) and a second UE (e.g., a transmitter UE). The receiver UE and the transmitter UE are not shown in FIG. 6.

As shown, the first UE may receive, from the second UE, a plurality of PSSCHs. For example, the first UE may receive one or more PSSCHs on the first CC and one or more PSSCHs on the second CC. As indicated by the arrows from the PSSCHs, the UE may provide HARQ feedback regarding the plurality of PSSCHs on a PSFCH transmitted via a designated set of CCs. In example 600, the designated set of CCs includes only CC0, though other examples may include a different CC (e.g., CC1) or multiple CCs (e.g., CC0 and CC1). The HARQ feedback may be reported using resources that have been configured for reporting of one or more bits of HARQ over a single component carrier.

As indicated above, FIG. 6 is provided as an example. Other examples may differ from what is described with respect to FIG. 6.

Figure 7:
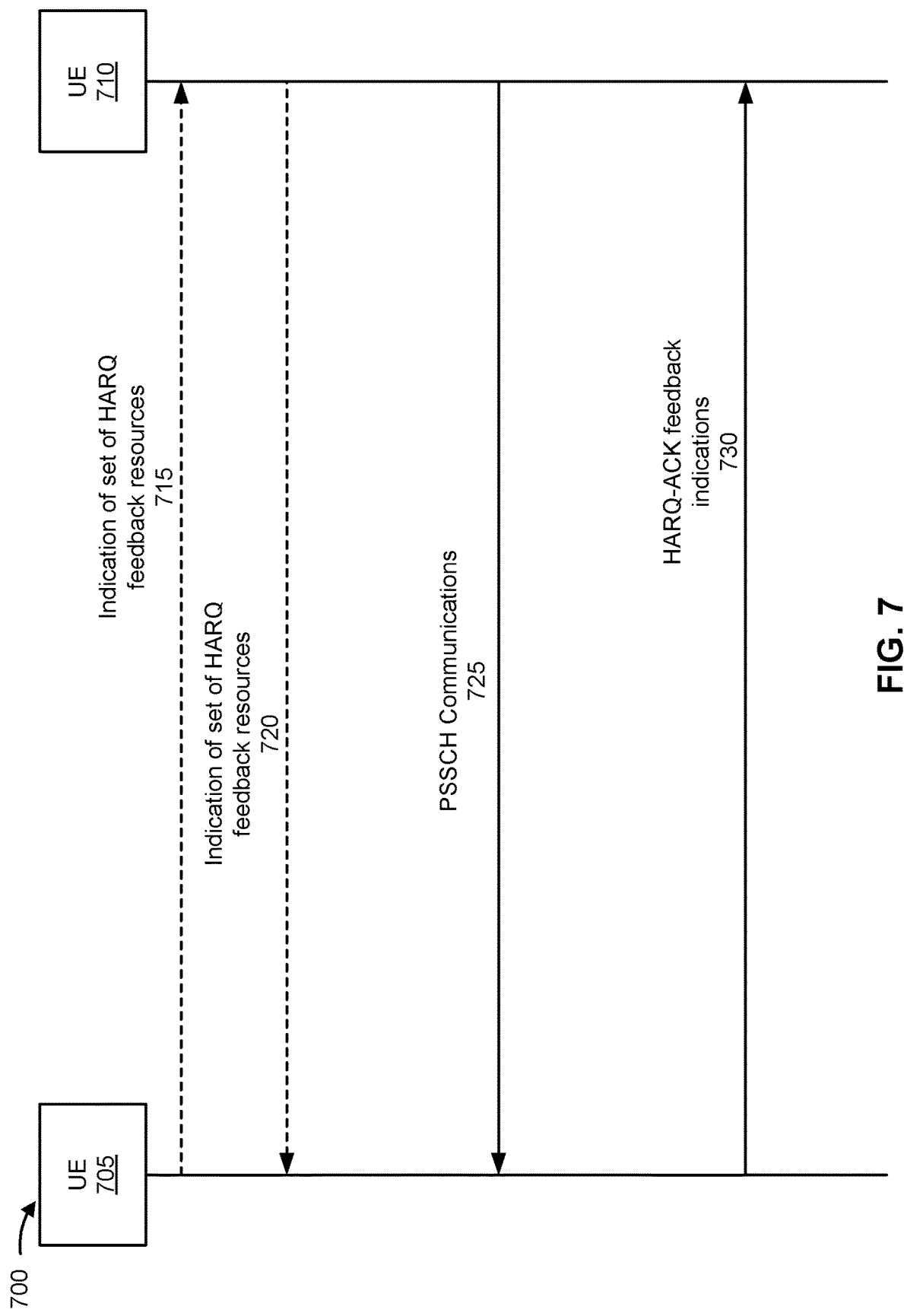
FIG. 7 is a diagram illustrating an example of signaling associated with resource determination for sidelink hybrid automatic repeat request (HARQ) feedback, in accordance with various aspects of the present disclosure.

FIG. 7 is a diagram illustrating an example 700 of signaling associated with HARQ feedback resource configuration for sidelink with carrier aggregation, in accordance with various aspects of the present disclosure. As shown in FIG. 7, a first UE 705 and a second UE 710 may communicate with one another.

As shown by reference number 715, the first UE 705 may transmit, to the second UE 710, an indication of a set of HARQ feedback resources. The set of HARQ feedback resources may include a set of resources on a single component carrier of a plurality of sidelink component carriers that may be used to transmit one or more HARQ acknowledgment (HARQ-ACK) feedback indications. The set of resources may include a set of PSFCH resources. In some aspects, the first UE 705 may determine the set of resources. In some aspects, the second UE 710 may determine the set of resources. As shown by reference number 720, in some aspects, the second UE 710 may transmit, and the first UE 705 may receive, the indication of the set of HARQ feedback resources. In some examples, the indication may be provided by another entity such as, for example, a base station.

In some aspects, the UE 705 and/or the UE 710 may determine the set of resources based at least in part on an explicit indication and/or an implicit indication. In some aspects, if the number of resources in the set of resources satisfies a resource threshold, the resources may be explicitly indicated. The threshold may be associated with a number of bits available in a sidelink control information (SCI) message for explicitly indicating the resources. Thus, for example, in some aspects, if the number of resources is less than or equal to the greatest number of resources that can be indicated using the SCI message (e.g., an SCI-2 message), the SCI message may be used. Otherwise, an implicit indication may be used in lieu of, or in addition to, the explicit indication. In some aspects, a pool of resources may be partitioned into different sets based at least in part on a maximum payload size.

For example, if the number of resources in the set is less than or equal to X, where log 2(X) bits are available in the SCI (e.g., SCI2) message, the SCI message may be used. This indication may be received from a base station, either directly or indirectly. For example, the base station may transmit the indication to the second UE 710, and the second UE 710 may include the indication in its transmission to the first UE 705. In some aspects, the second UE 710 may select the set of resources.

In some aspects, if the number of resources per set fails to satisfy the resource threshold (e.g., the number of resources in the set>X), an implicit indication may be used. The implicit indication may be a function of a set of subchannels used for a prior transmission (e.g., the index of the starting subchannel or the index of the starting resource block). The prior transmission may be a PSCCH transmission and/or a PSSCH transmission. The prior transmission may include a most recent transmission (e.g., the PSCCH associated with the most recent PSSCH). In some aspects, the UE 705 and/or 710 may determine the prior transmission based at least in part on a plurality of monitoring occasions associated with a slot across the plurality of component carriers. The UE 705 and/or 710 may determine the implicit indication based at least in part on determining the prior transmission based at least in part on a time period associated with a plurality of slots.

In some aspects, the implicit indication may include at least one of: a source identifier (ID), a destination ID, a slot ID, a sidelink zone ID, resource pool ID, sidelink component carrier ID, and/or bandwidth part ID, among other examples. The UE 705 and/or 710 may determine a subset of a resource pool based at least in part on the implicit indication and determine the set of resources based at least in part on a PSFCH resource indication. In some aspects, the UE 705 and/or 710 may determine the subset of the resource pool based at least in part on a determination of the resource pool. The determination of the subset of the resource pool may be based at least in part on a determination of the single carrier, and/or a cast type associated with transmitting the plurality of HARQ-ACK feedback indications, among other examples.

For example, if a resource set has more than X resources, an X' number of resources may be selected based on one or more of the above factors. The sidelink PSFCH resource indication (S-PRI) may be used to indicate a selected set of the X' resources. The selection of the subset may be indicated by a base station directly or indirectly, may be negotiated between the sidelink UEs 705 and 710, and/or a subset selection may be defined on a per resource pool and/or carrier basis. In some aspects, the selection formula may be dependent on the cast type (e.g., unicast, connection-less groupcast or managed groupcast).

In some aspects, the UE 705 and/or 710 may determine a PSSCH-to-HARQ gap, K1, based at least in part on an explicit indication. The UE 705 and/or 710 may determine a PSSCH-to-HARQ gap based at least in part on an implicit indication. For example, as part of PSFCH resource determination, K1 may be signaled by the second UE 710. This indication may have been received, by the second UE 710, either directly or indirectly from a base station. In some aspects, a set of K1 values may be configured for a resource pool and/or carrier and may also be dependent on the cast type, zone ID, and/or channel busy radio (CBR). In some aspects, for example, this may be useful where a relay is supporting multiple remote UEs and has the capability to manage the HARQ feedbacks from different UEs.

In some aspects, a UE may not be able to transmit, simultaneously, all corresponding feedback indications in response to the PSSCH communications the UE received. In such instances, the format and the payload of the PSFCH transmissions may be considered to facilitate deciding which indications should be dropped. This may be in addition to taking the packet priorities associated with the HARQ-ACK bits into account. In some aspects, the UE 705 may transmit a first set of HARQ-ACK feedback indications of the plurality of HARQ-ACK feedback indications and drop a second set of HARQ-ACK feedback indications based at least in part on at least one of a format of the set of HARQ-ACK feedback indications or a payload of the set of HARQ-ACK feedback indications. In this way, by dropping a PSFCH carrying a larger payload, more re-transmissions may be triggered, which may make the resource pool congested.

As shown by reference number 725, the second UE 710 may transmit, and the first UE 705 may receive, a plurality of PSSCH communications on a plurality of sidelink component carriers of a sidelink network having carrier aggregation. As shown by reference number 730, the first UE 705 may transmit, and the second UE 710 may receive, a plurality of HARQ-ACK feedback indications corresponding to the plurality of PSSCH communications. In some aspects, the first UE 705 may transmit the HARQ-ACK feedback indications using the set of HARQ feedback resources.

As indicated above, FIG. 7 is provided as an example. Other examples may differ from what is described with respect to FIG. 7.

Figure 8:
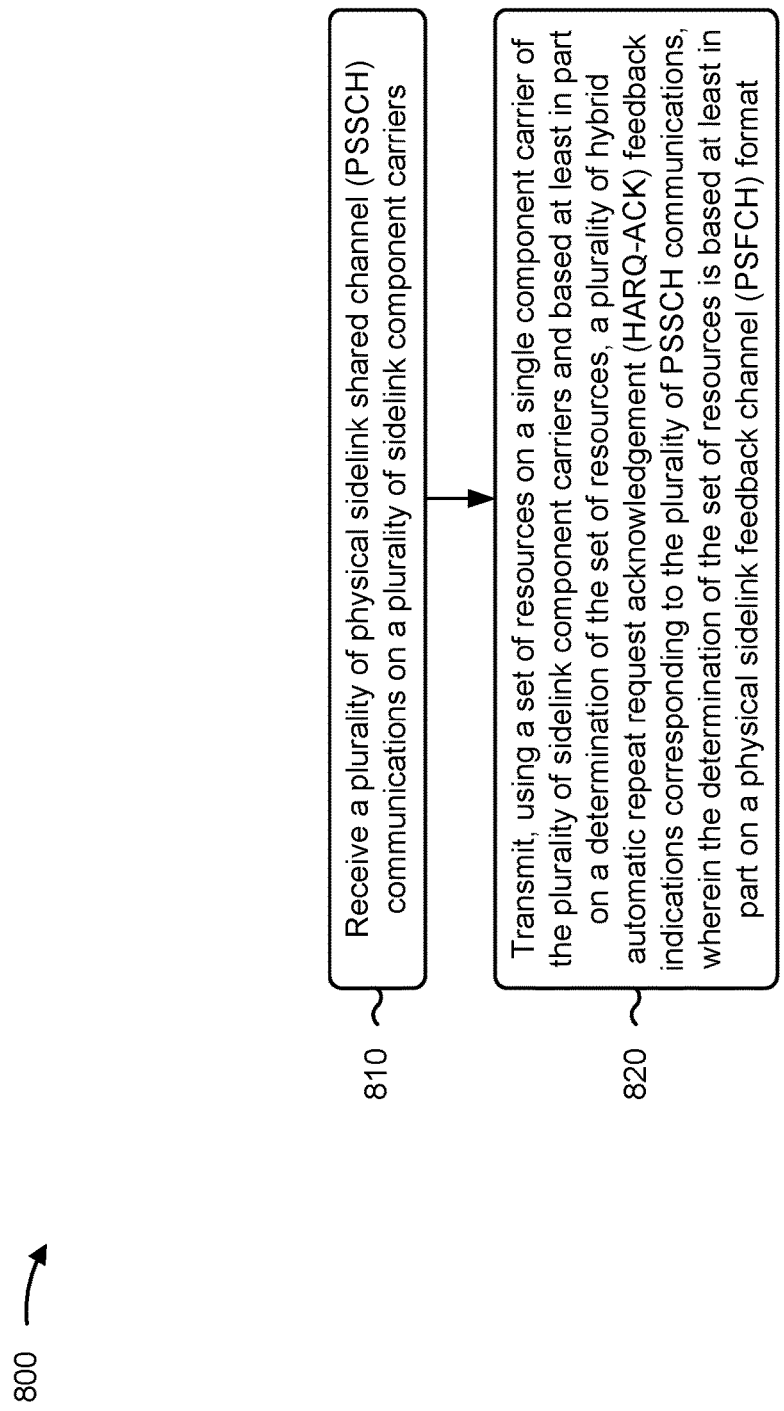
FIGS. 8 and 9 are diagrams illustrating example processes associated with resource determination for HARQ feedback, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 705) performs operations associated with resource determination for sidelink HARQ feedback.

As shown in FIG. 8, in some aspects, process 800 may include receiving a plurality of PSSCH communications on a plurality of sidelink component carriers (block 810). For example, the UE (e.g., using reception component 1002, depicted in FIG. 10) may receive a plurality of PSSCH communications on a plurality of sidelink component carriers, as described above.

As further shown in FIG. 8, in some aspects, process 800 may include transmitting, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format (block 820). For example, the UE (e.g., using transmission component 1004, depicted in FIG. 10) may transmit, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format, as described above.

Process 800 may include additional aspects, such as any single aspect or any combination of aspects described below and/or in connection with one or more other processes described elsewhere herein.

In a first aspect, process 800 includes receiving an explicit indication that indicates the set of resources and determining the set of resources based at least in part on the explicit indication.

In a second aspect, alone or in combination with the first aspect, process 800 includes receiving the explicit indication from a base station.

In a third aspect, alone or in combination with one or more of the first and second aspects, process 800 includes receiving the explicit indication from an additional UE, wherein receiving the plurality of PSSCH communications comprises receiving the plurality of PSSCH communications from the additional UE.

In a fourth aspect, alone or in combination with one or more of the first through third aspects, receiving the explicit indication comprises receiving the explicit indication based at least in part on a determination that a number of resources in the set of resources satisfies a resource threshold.

In a fifth aspect, alone or in combination with one or more of the first through fourth aspects, process 800 includes determining an implicit indication that indicates the set of resources and determining the set of resources based at least in part on the implicit indication.

In a sixth aspect, alone or in combination with the fifth aspect, determining the implicit indication comprises determining the implicit indication based at least in part on a determination that a number of resources in the set of resources fails to satisfy a resource threshold.

In a seventh aspect, alone or in combination with one or more of the fifth or sixth aspects, the implicit indication comprises a function of a set of subchannels used for a prior transmission.

In an eighth aspect, alone or in combination with the seventh aspect, the prior transmission may include a most recent transmission.

In a ninth aspect, alone or in combination with the seventh aspect, the implicit indication comprises an index of a starting subchannel of the set of subchannels.

In a tenth aspect, alone or in combination with one or more of the seventh through ninth aspects, the implicit indication comprises an index of a starting resource block of the set of resources.

In an eleventh aspect, alone or in combination with one or more of the seventh through tenth aspects, process 800 includes determining the implicit indication based at least in part on determining the prior transmission based at least in part on a plurality of monitoring occasions associated with a slot across the plurality of component carriers.

In a twelfth aspect, alone or in combination with one or more of the seventh through eleventh aspects, process 800 includes determining the implicit indication based at least in part on determining the prior transmission based at least in part on a time period associated with a plurality of slots.

In a thirteenth aspect, alone or in combination with one or more of the fifth through twelfth aspects, the implicit indication comprises at least one of a source identifier (ID), a destination ID, a slot ID, a sidelink zone ID, a resource pool ID, a sidelink component carrier ID, or a bandwidth part ID.

In a fourteenth aspect, alone or in combination with the thirteenth aspect, process 800 includes determining a subset of a resource pool based at least in part on the implicit indication and determining the set of resources based at least in part on a PSFCH resource indication.

In a fifteenth aspect, alone or in combination with the fourteenth aspect, determining the subset of the resource pool comprises determining the subset of the resource pool based at least in part on a determination of the resource pool.

In a sixteenth aspect, alone or in combination with one or more of the fourteenth or fifteenth aspects, determining the subset of the resource pool comprises determining the subset of the resource pool based at least in part on a determination of the single carrier.

In a seventeenth aspect, alone or in combination with one or more of the fourteenth through sixteenth aspects, determining the subset of the resource pool comprises determining the subset of the resource pool based at least in part on a cast type associated with transmitting the plurality of HARQ-ACK feedback indications.

In an eighteenth aspect, alone or in combination with one or more of the fourteenth through seventeenth aspects, process 800 includes receiving the implicit indication from a base station.

In a nineteenth aspect, alone or in combination with one or more of the fifth through eighteenth aspects, process 800 includes receiving the implicit indication from a base station by way of a relay device.

In a twentieth aspect, alone or in combination with one or more of the fifth through nineteenth aspects, process 800 includes determining the implicit indication based at least in part on a negotiation with an additional UE.

In a twenty-first aspect, alone or in combination with one or more of the first through twentieth aspects, process 800 includes determining a PSSCH-to-HARQ gap based at least in part on an explicit indication.

In a twenty-second aspect, alone or in combination with one or more of the first through twenty-first aspects, process 800 includes determining a PSSCH-to-HARQ gap based at least in part on an implicit indication.

In a twenty-third aspect, alone or in combination with one or more of the first through twenty-second aspects, transmitting the plurality of HARQ-ACK feedback indications comprises transmitting a first set of HARQ-ACK feedback indications of the plurality of HARQ-ACK feedback indications, and dropping a second set of HARQ-ACK feedback indications based at least in part on at least one of a format of the set of HARQ-ACK feedback indications or a payload of the set of HARQ-ACK feedback indications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
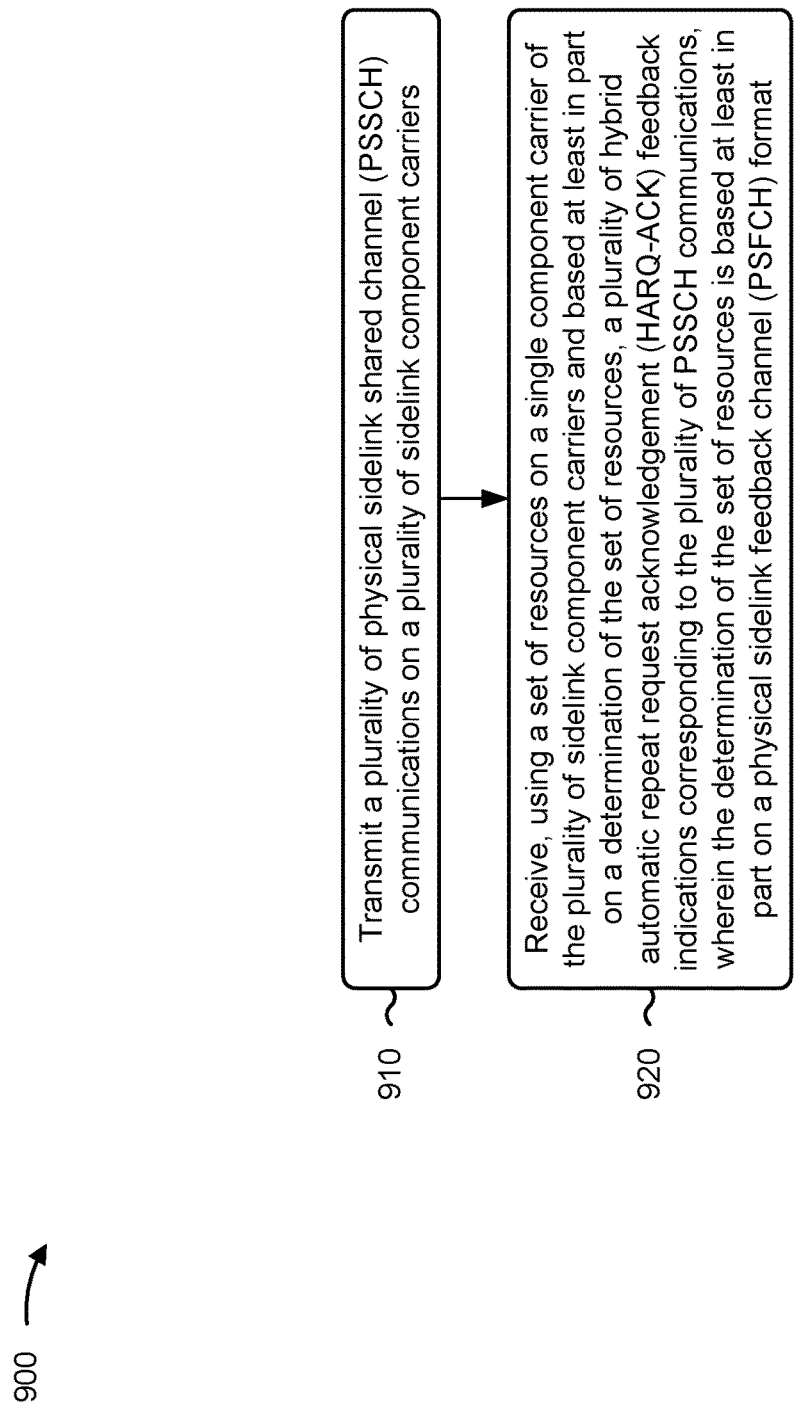

FIG. 9 is a diagram illustrating an example process 900 performed, for example, by a UE, in accordance with various aspects of the present disclosure. Example process 900 is an example where the UE (e.g., UE 710) performs operations associated with resource determination for sidelink HARQ feedback.

As shown in FIG. 9, in some aspects, process 900 may include transmitting a plurality of PSSCH communications on a plurality of sidelink component carriers (block 910). For example, the UE (e.g., using transmission component 1004, depicted in FIG. 10) may transmit a plurality of PSSCH communications on a plurality of sidelink component carriers, as described above.

As further shown in FIG. 9, in some aspects, process 900 may include receiving, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format (block 920). For example, the UE (e.g., using reception component 1002, depicted in FIG. 10) may receive, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format, as described above.

Process 900 may include additional aspects, such as any single aspect or any combination of aspects described below and/or in connection with one or more other processes described elsewhere herein.

In a first aspect, process 900 includes transmitting an explicit indication that indicates the set of resources, wherein the determination of the set of resources is based at least in part on the explicit indication.

In a second aspect, alone or in combination with the first aspect, process 900 includes receiving the explicit indication from a base station.

In a third aspect, alone or in combination with one or more of the first and second aspects, transmitting the explicit indication comprises transmitting the explicit indication based at least in part on a determination that a number of resources in the set of resources satisfies a resource threshold.

In a fourth aspect, alone or in combination with one or more of the first through third aspects, the determination of the set of resources is based at least in part on a determination of an implicit indication.

In a fifth aspect, alone or in combination with the fourth aspect, the determination of the implicit indication is based at least in part on a determination that a number of resources in the set of resources fails to satisfy a resource threshold.

In a sixth aspect, alone or in combination with one or more of the fourth or fifth aspects, the implicit indication comprises a function of a set of subchannels used for a prior transmission.

In a seventh aspect, the prior transmission may include a most recent transmission.

In an eighth aspect, alone or in combination with one or more of the fourth through sixth aspects, the implicit indication comprises an index of a starting subchannel of the set of subchannels.

In a ninth aspect, alone or in combination with one or more of the fourth through eighth aspects, the implicit indication comprises an index of a starting resource block of the set of resources.

In a tenth aspect, alone or in combination with one or more of the fourth through ninth aspects, the determination of the implicit indication is based at least in part on a determination of a prior transmission based at least in part on a plurality of monitoring occasions associated with a slot across the plurality of component carriers.

In an eleventh aspect, alone or in combination with one or more of the fourth through tenth aspects, the determination of the implicit indication is based at least in part on a determination of a prior transmission based at least in part on a time period associated with a plurality of slots.

In a twelfth aspect, alone or in combination with one or more of the fourth through eleventh aspects, the implicit indication comprises at least one of a source identifier (ID), a destination ID, a slot ID, a sidelink zone ID, a resource pool ID, a sidelink component carrier ID, or a bandwidth part ID.

In a thirteenth aspect, alone or in combination with the twelfth aspect, the determination of the set of resources is based at least in part on a determination of a subset of a resource pool based at least in part on the implicit indication, and a determination of a PSFCH resource indication.

In a fourteenth aspect, alone or in combination with the thirteenth aspect, the determination of the subset of the resource pool is based at least in part on a determination of the resource pool.

In a fifteenth aspect, alone or in combination with one or more of the thirteenth or fourteenth aspects, the determination of the subset of the resource pool is based at least in part on a determination of the single carrier.

In a sixteenth aspect, alone or in combination with one or more of the thirteenth through fifteenth aspects, the determination of the subset of the resource pool is based at least in part on a cast type associated with transmitting the plurality of HARQ-ACK feedback indications.

In a seventeenth aspect, alone or in combination with one or more of the thirteenth through sixteenth aspects, the determination of the implicit indication is based at least in part on a negotiation with an additional UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
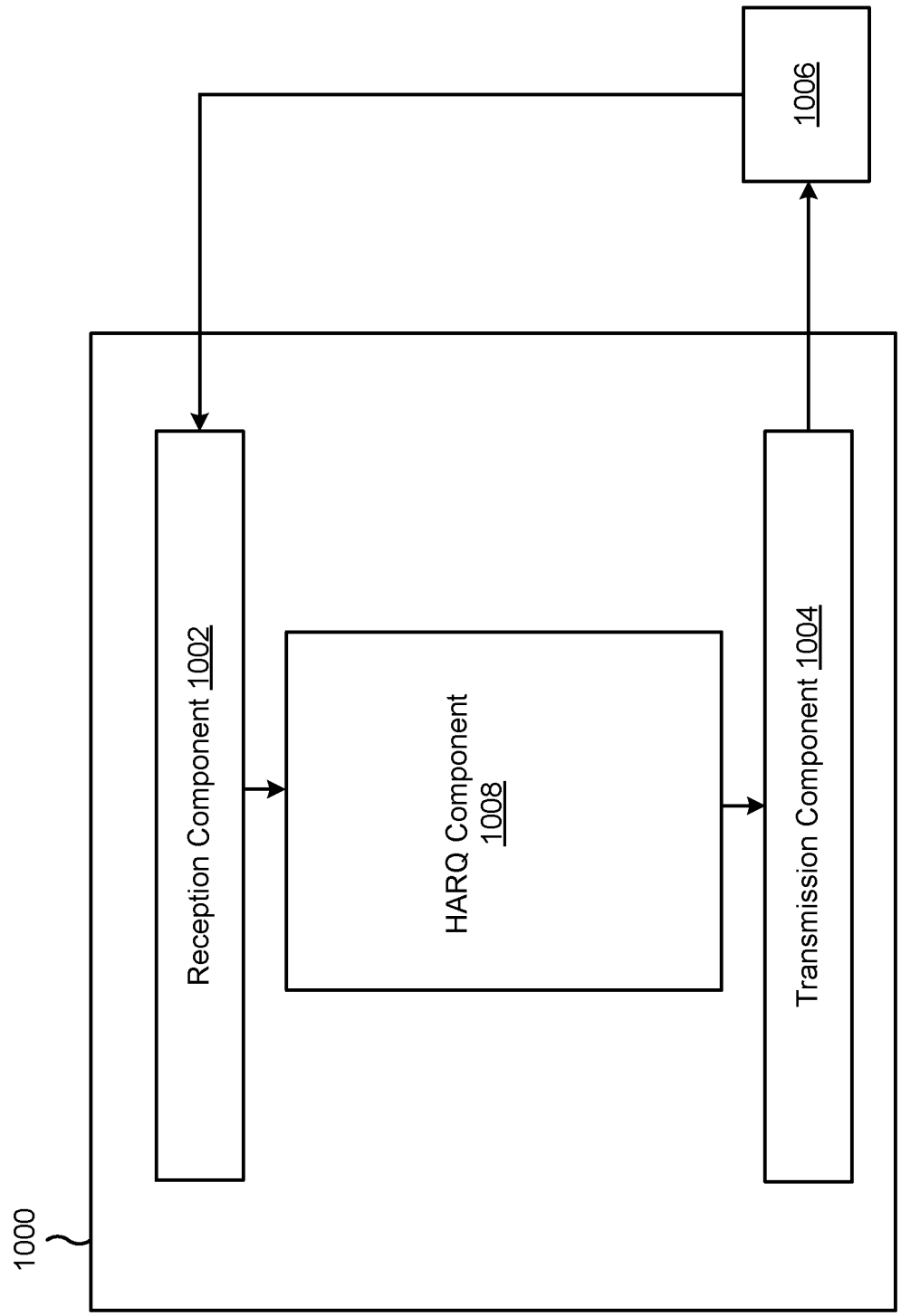
FIG. 10 is a block diagram of an example apparatus for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a HARQ component 1008 configured to generate, interpret, and/or otherwise manage HARQ-ACK feedback indications.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver. The HARQ component 1008 may include one or more antennas, a modulator, a transmit MIMO processor, a transmit processor, a controller/processor, a memory, or a combination thereof, of the UE described above in connection with FIG. 2.

The reception component 1002 may receive a plurality of PSSCH communications on a plurality of sidelink component carriers. The transmission component 1004 may transmit, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

The reception component 1002 may receive an explicit indication that indicates the set of resources. The HARQ component 1008 may determine the set of resources based at least in part on the explicit indication. The reception component 1002 may receive the explicit indication from a base station.

The reception component 1002 may receive the explicit indication from an additional UE, wherein receiving the plurality of PSSCH communications comprises receiving the plurality of PSSCH communications from the additional UE. The HARQ component 1008 may determine an implicit indication that indicates the set of resources. The HARQ component 1008 may determine the set of resources based at least in part on the implicit indication. The HARQ component 1008 may determine the implicit indication based at least in part on determining the prior transmission based at least in part on a plurality of monitoring occasions associated with a slot across the plurality of component carriers. The HARQ component 1008 may determine the implicit indication based at least in part on determining the prior transmission based at least in part on a time period associated with a plurality of slots. The HARQ component 1008 may determine a subset of a resource pool based at least in part on the implicit indication. The HARQ component 1008 may determine the set of resources based at least in part on a PSFCH resource indication.

The reception component 1002 may receive the implicit indication from a base station. The reception component 1002 may receive the implicit indication from a base station by way of a relay device. The HARQ component 1008 may determine the implicit indication based at least in part on a negotiation with an additional UE. The HARQ component

1008 may determine a PSSCH-to-HARQ gap based at least in part on an explicit indication. The HARQ component 1008 may determine a PSSCH-to-HARQ gap based at least in part on an implicit indication.

The transmission component 1004 may transmit a plurality of PSSCH communications on a plurality of sidelink component carriers. The reception component 1002 may receive, using a set of resources on a single component carrier of the plurality of sidelink component carriers and based at least in part on a determination of the set of resources, a plurality of HARQ-ACK feedback indications corresponding to the plurality of PSSCH communications, wherein the determination of the set of resources is based at least in part on a PSFCH format.

The transmission component 1004 may transmit an explicit indication that indicates the set of resources, wherein the determination of the set of resources is based at least in part on the explicit indication. The reception component 1002 may receive the explicit indication from a base station.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of aspects of the present disclosure:

Aspect 1: A method of wireless communication performed by a user equipment (UE), comprising: receiving a plurality of physical sidelink shared channel (PSSCH) communications on a plurality of sidelink component carriers; and transmitting, using a set of resources on a single component carrier of the plurality of sidelink component carriers and based at least in part on a determination of the set of resources, a plurality of hybrid automatic repeat request acknowledgement (HARQ-ACK) feedback indications corresponding to the plurality of PSSCH communications, wherein the determination of the set of resources is based at least in part on a physical sidelink feedback channel (PSFCH) format.

Aspect 2: The method of aspect 1, further comprising: receiving an explicit indication that indicates the set of resources; and determining the set of resources based at least in part on the explicit indication.

Aspect 3: The method of aspect 2, further comprising receiving the explicit indication from a base station.

Aspect 4: The method of either of aspects 2 or 3, further comprising receiving the explicit indication from an additional UE, wherein receiving the plurality of PSSCH communications comprises receiving the plurality of PSSCH communications from the additional UE.

Aspect 5: The method of any of aspects 2-4, wherein receiving the explicit indication comprises receiving the explicit indication based at least in part on a determination that a number of resources in the set of resources satisfies a resource threshold.

Aspect 6: The method of any of aspects 1-5, further comprising: determining an implicit indication that indicates the set of resources; and determining the set of resources based at least in part on the implicit indication.

Aspect 7: The method of aspect 6, wherein determining the implicit indication comprises determining the implicit indication based at least in part on a determination that a number of resources in the set of resources fails to satisfy a resource threshold.

Aspect 8: The method of either of aspects 6 or 7, wherein the implicit indication comprises a function of a set of subchannels used for a prior transmission.

Aspect 9: The method of any of aspects 6-8, wherein the prior transmission is a most recent transmission.

Aspect 10: The method of aspect 8, wherein the implicit indication comprises an index of a starting subchannel of the set of subchannels.

Aspect 11: The method of any of aspects 8-10, wherein the implicit indication comprises an index of a starting resource block of the set of resources.

Aspect 12: The method of any of aspects 8-11, further comprising determining the implicit indication based at least in part on determining the prior transmission based at least in part on a plurality of monitoring occasions associated with a slot across the plurality of component carriers.

Aspect 13: The method of any of aspects 8-12, further comprising determining the implicit indication based at least in part on determining the prior transmission based at least in part on a time period associated with a plurality of slots.

Aspect 14: The method of any of aspects 6-13, wherein the implicit indication comprises at least one of: a source identifier (ID), a destination ID, a slot ID, a sidelink zone ID, a resource pool ID, a sidelink component carrier ID, or a bandwidth part ID.

Aspect 15: The method of aspect 14, further comprising: determining a subset of a resource pool based at least in part on the implicit indication; and determining the set of resources based at least in part on a PSFCH resource indication.

Aspect 16: The method of aspect 15, wherein determining the subset of the resource pool comprises determining the subset of the resource pool based at least in part on a determination of the resource pool.

Aspect 17: The method of either of aspects 15 or 16, wherein determining the subset of the resource pool comprises determining the subset of the resource pool based at least in part on a determination of the single carrier.

Aspect 18: The method of any of aspects 15-17, wherein determining the subset of the resource pool comprises determining the subset of the resource pool based at least in part on a cast type associated with transmitting the plurality of HARQ-ACK feedback indications.

Aspect 19: The method of any of aspects 15-18, further comprising receiving the implicit indication from a base station.

Aspect 20: The method of any of aspects 6-19, further comprising receiving the implicit indication from a base station by way of a relay device.

Aspect 21: The method of any of aspects 6-20, further comprising determining the implicit indication based at least in part on a negotiation with an additional UE.

Aspect 22: The method of any of aspects 1-21, further comprising determining a PSSCH-to-HARQ gap based at least in part on an explicit indication.

Aspect 23: The method of any of aspects 1-22, further comprising determining a PSSCH-to-HARQ gap based at least in part on an implicit indication.

Aspect 24: The method of any of aspects 1-23, wherein transmitting the plurality of HARQ-ACK feedback indications comprises: transmitting a first set of HARQ-ACK feedback indications of the plurality of HARQ-ACK feedback indications; and dropping a second set of HARQ-ACK feedback indications based at least in part on at least one of a format of the set of HARQ-ACK feedback indications or a payload of the set of HARQ-ACK feedback indications.

Aspect 25: A method of wireless communication performed by a user equipment (UE), comprising: transmitting a plurality of physical sidelink shared channel (PSSCH) communications on a plurality of sidelink component carriers; and receiving, using a set of resources on a single component carrier of the plurality of sidelink component carriers and based at least in part on a determination of the set of resources, a plurality of hybrid automatic repeat request acknowledgement (HARQ-ACK) feedback indications corresponding to the plurality of PSSCH communications, wherein the determination of the set of resources is based at least in part on a physical sidelink feedback channel (PSFCH) format.

Aspect 26: The method of aspect 25, further comprising transmitting an explicit indication that indicates the set of resources, wherein the determination of the set of resources is based at least in part on the explicit indication.

Aspect 27: The method of aspect 26, further comprising receiving the explicit indication from a base station.

Aspect 28: The method of either of aspects 26 or 27, wherein transmitting the explicit indication comprises transmitting the explicit indication based at least in part on a determination that a number of resources in the set of resources satisfies a resource threshold.

Aspect 29: The method of any of aspects 25-28, wherein the determination of the set of resources is based at least in part on a determination of an implicit indication.

Aspect 30: The method of aspect 29, wherein the determination of the implicit indication is based at least in part on a determination that a number of resources in the set of resources fails to satisfy a resource threshold.

Aspect 31: The method of either of aspects 29 or 30, wherein the implicit indication comprises a function of a set of subchannels used for a prior transmission.

Aspect 32: The method of any of aspects 30-31, wherein the implicit indication comprises an index of a starting subchannel of the set of subchannels.

Aspect 33: The method of any of aspects 29-32, wherein the implicit indication comprises an index of a starting resource block of the set of resources.

Aspect 34: The method of any of aspects 29-33, wherein the determination of the implicit indication is based at least in part on a determination of a prior transmission based at least in part on a plurality of monitoring occasions associated with a slot across the plurality of component carriers.

Aspect 35: The method of any of aspects 29-34, wherein the determination of the implicit indication is based at least in part on a determination of a prior transmission based at least in part on a time period associated with a plurality of slots.

Aspect 36: The method of any of aspects 29-35, wherein the implicit indication comprises at least one of: a source identifier (ID), a destination ID, a slot ID, a sidelink zone ID, a resource pool ID, a sidelink component carrier ID, or a bandwidth part ID.

Aspect 37: The method of aspect 36, wherein the determination of the set of resources is based at least in part on: a determination of a subset of a resource pool based at least in part on the implicit indication; and a determination of a PSFCH resource indication.

Aspect 38: The method of aspect 37, wherein the determination of the subset of the resource pool is based at least in part on a determination of the resource pool.

Aspect 39: The method of either of aspects 37 or 38, wherein the determination of the subset of the resource pool is based at least in part on a determination of the single carrier.

Aspect 40: The method of any of aspects 37-39, wherein the determination of the subset of the resource pool is based at least in part on a cast type associated with transmitting the plurality of HARQ-ACK feedback indications.

Aspect 41: The method of any of aspects 37-40, wherein the determination of the implicit indication is based at least in part on a negotiation with an additional UE.

Aspect 42: An apparatus for wireless communication at a device, comprising a processor; memory coupled with the processor; and instructions stored in the memory and executable by the processor to cause the apparatus to perform the method of one or more aspects of aspects 1-24.

Aspect 43: A device for wireless communication, comprising a memory and one or more processors coupled to the memory, the memory and the one or more processors configured to perform the method of one or more aspects of aspects 1-24.

Aspect 44: An apparatus for wireless communication, comprising at least one means for performing the method of one or more aspects of aspects 1-24.

Aspect 45: A non-transitory computer-readable medium storing code for wireless communication, the code comprising instructions executable by a processor to perform the method of one or more aspects of aspects 1-24.

Aspect 46: A non-transitory computer-readable medium storing a set of instructions for wireless communication, the set of instructions comprising one or more instructions that, when executed by one or more processors of a device, cause the device to perform the method of one or more aspects of aspects 1-24.

Aspect 47: An apparatus for wireless communication at a device, comprising a processor; memory coupled with the processor; and instructions stored in the memory and executable by the processor to cause the apparatus to perform the method of one or more aspects of aspects 25-41.

Aspect 48: A device for wireless communication, comprising a memory and one or more processors coupled to the memory, the memory and the one or more processors configured to perform the method of one or more aspects of aspects 25-41.

Aspect 49: An apparatus for wireless communication, comprising at least one means for performing the method of one or more aspects of aspects 25-41.

Aspect 50: A non-transitory computer-readable medium storing code for wireless communication, the code comprising instructions executable by a processor to perform the method of one or more aspects of aspects 25-41.

Aspect 51: A non-transitory computer-readable medium storing a set of instructions for wireless communication, the set of instructions comprising one or more instructions that, when executed by one or more processors of a device, cause the device to perform the method of one or more aspects of aspects 25-41.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more processors configured to:
receive a plurality of physical sidelink shared channel (PSSCH) communications on a plurality of sidelink component carriers;
transmit, using a set of resources on a single component carrier of the plurality of sidelink component carriers and based at least in part on a determination of the set of resources, a plurality of hybrid automatic repeat request acknowledgement (HARQ-ACK) feedback indications corresponding to the plurality of PSSCH communications,
wherein the plurality of HARQ-ACK feedback indications include a first set of HARQ-ACK feedback indications, and
wherein the determination of the set of resources is based at least in part on a physical sidelink feedback channel (PSFCH) format; and
drop a second set of HARQ-ACK feedback indications based at least in part on a format of the set of HARQ-ACK feedback indications.

2. The UE of claim 1, wherein the one or more memories and the one or more processors are further configured to:
receive an indication that indicates the set of resources; and
determine the set of resources based at least in part on the indication, wherein the indication comprises at least one of: an explicit indication or an implicit indication.

3. The UE of claim 2, wherein the one or more memories and the one or more processors are further configured to receive the explicit indication from an additional UE, wherein the one or more processors, when receiving the plurality of PSSCH communications, are configured to receive the plurality of PSSCH communications from the additional UE.

4. The UE of claim 2, wherein the one or more memories and the one or more processors, when receiving the explicit indication, are configured to receive the explicit indication based at least in part on a determination that a number of resources in the set of resources satisfies a resource threshold.

5. The UE of claim 2, wherein the one or more memories and the one or more processors, when determining the implicit indication, are configured to determine the implicit indication based at least in part on a determination that a number of resources in the set of resources fails to satisfy a resource threshold.

6. The UE of claim 2, wherein the implicit indication comprises a function of a set of subchannels used for a prior transmission.

7. The UE of claim 6, wherein the prior transmission is a most recent transmission.

8. The UE of claim 6, wherein the implicit indication comprises an index of at least one of: a starting subchannel of the set of subchannels or a starting resource block of the set of resources.

9. The UE of claim 6, wherein the one or more memories and the one or more processors are further configured to determine the implicit indication based at least in part on determining the prior transmission based at least in part on a plurality of monitoring occasions associated with a slot across the plurality of sidelink component carriers.

10. The UE of claim 2, wherein the implicit indication comprises at least one of:
a source identifier (ID), a destination ID, a slot ID, a sidelink zone ID, a resource pool ID, a sidelink component carrier ID, or
a bandwidth part ID.

11. The UE of claim 10, wherein the one or more memories and the one or more processors are further configured to:
determine a subset of a resource pool based at least in part on the implicit indication; and
determine the set of resources based at least in part on a PSFCH resource indication.

12. The UE of claim 11, wherein the one or more memories and the one or more processors, when determining the subset of the resource pool, are configured to determine the subset of the resource pool based at least in part on a determination of at least one of: on a cast type associated with transmitting the plurality of HARQ-ACK feedback indications, the resource pool, or the single component carrier.

13. The UE of claim 2, wherein the one or more memories and the one or more processors are further configured to determine the implicit indication based at least in part on a negotiation with an additional UE.

14. The UE of claim 1, wherein the one or more memories and the one or more processors are further configured to determine a PSSCH-to-HARQ gap based at least in part on at least one of: an explicit indication or an implicit indication.

15. The UE of claim 1, wherein the one or more memories and the one or more processors, when dropping the second set of HARQ-ACK feedback indications, are configured to:
drop the second set of HARQ-ACK feedback indications further based at least in part on a payload of the set of HARQ- ACK feedback indications.

16. A method of wireless communication performed by a user equipment (UE), comprising:
receiving a plurality of physical sidelink shared channel (PSSCH) communications on a plurality of sidelink component carriers;
transmitting, using a set of resources on a single component carrier of the plurality of sidelink component carriers and based at least in part on a determination of the set of resources, a plurality of hybrid automatic repeat request acknowledgement (HARQ-ACK) feedback indications corresponding to the plurality of PSSCH communications,
wherein the plurality of HARQ-ACK feedback indications include a first set of HARQ-ACK feedback indications, and
wherein the determination of the set of resources is based at least in part on a physical sidelink feedback channel (PSFCH) format; and
dropping a second set of HARQ-ACK feedback indications based at least in part on a format of the set of HARQ-ACK feedback indications.

17. The method of claim 16, further comprising:
receiving an indication that indicates the set of resources; and
determining the set of resources based at least in part on the indication, wherein the indication comprises at least one of: an explicit indication or an implicit indication.

18. The method of claim 17, further comprising receiving the explicit indication from an additional UE, wherein receiving the plurality of PSSCH communications comprises receiving the plurality of PSSCH communications from the additional UE.

19. The method of claim 17, wherein receiving the explicit indication comprises receiving the explicit indication based at least in part on a determination that a number of resources in the set of resources satisfies a resource threshold.

20. The method of claim 17, wherein determining the implicit indication comprises determining the implicit indication based at least in part on a determination that a number of resources in the set of resources fails to satisfy a resource threshold.

21. The method of claim 17, wherein the implicit indication comprises a function of a set of subchannels used for a prior transmission.

22. The method of claim 21, wherein the prior transmission is a most recent transmission.

23. The method of claim 21, wherein the implicit indication comprises an index of at least one of. a starting subchannel of the set of subchannels or a starting resource block of the set of resources.

24. The method of claim 21, further comprising determining the implicit indication based at least in part on determining the prior transmission based at least in part on a plurality of monitoring occasions associated with a slot across the plurality of sidelink component carriers.

25. The method of claim 17, wherein the implicit indication comprises at least one of:
a source identifier (ID), a destination ID, a slot ID, a sidelink zone ID, a resource pool ID, a sidelink component carrier ID, or
a bandwidth part ID.

26. The method of claim 25, further comprising:
determining a subset of a resource pool based at least in part on the implicit indication;
and determining the set of resources based at least in part on a PSFCH resource indication.

27. The method of claim 26, wherein determining the subset of the resource pool comprises determining the subset of the resource pool based at least in part on:
a cast type associated with transmitting the plurality of HARQ-ACK feedback indications, a determination of at least one of the resource pool, or the single component carrier.

28. The method of claim 17, further comprising determining the implicit indication based at least in part on a negotiation with an additional UE.

29. The method of claim 16, further comprising determining a PSSCH-to- HARQ gap based at least in part on at least one of: an explicit indication or an implicit indication.

30. The method of claim 16, wherein dropping the second set of HARQ-ACK feedback indications comprises:
dropping the second set of HARQ-ACK feedback indications further based at least in part on a payload of the set of HARQ-ACK feedback indications.

* * * * *